United States Patent
Kerschner

[11] Patent Number: 6,098,947
[45] Date of Patent: Aug. 8, 2000

[54] COMPLIANT OPTICAL MIRROR MOUNTING SYSTEM FOR HAND-HELD SCANNER DEVICES

[75] Inventor: Ronald K. Kerschner, Loveland, Colo.

[73] Assignee: Hewlett-Packard Company, Palo Alto, Calif.

[21] Appl. No.: 09/022,462

[22] Filed: Feb. 12, 1998

[51] Int. Cl.[7] ............................ F16M 1/00; F16M 11/00; F16M 3/00; F16M 5/00; F16M 7/00
[52] U.S. Cl. ......................... 248/466; 248/468; 248/475.1
[58] Field of Search ..................... 248/466, 468, 248/475.1, 488, 73, 74.2, 229.16, 229.26; 24/543, 546, 547, 548, 549

[56] References Cited

U.S. PATENT DOCUMENTS

| | | | |
|---|---|---|---|
| 2,403,737 | 7/1946 | Mihalyi | 355/16 |
| 2,487,875 | 11/1949 | Hutchinson, Jr. | 248/475.1 |
| 2,625,359 | 1/1953 | Eagle | 248/466 |
| 2,665,611 | 1/1954 | Smith | 248/468 |
| 3,082,665 | 3/1963 | Jackson . | |
| 3,203,142 | 8/1965 | Narmore | 52/27 |
| 3,216,685 | 11/1965 | Raymond . | |
| 3,680,822 | 8/1972 | Kurtz | 248/475.1 |
| 3,994,050 | 11/1976 | Bub . | |
| 4,103,860 | 8/1978 | Haas et al. | 248/467 |
| 4,394,000 | 7/1983 | Kurtz | 248/466 |
| 4,397,438 | 8/1983 | Chapman . | |
| 4,869,582 | 9/1989 | Nakajima et al. | 350/631 |
| 4,926,041 | 5/1990 | Boyd | 250/226 |
| 4,984,882 | 1/1991 | Boyd . | |
| 5,032,004 | 7/1991 | Steinle | 350/171 |
| 5,364,051 | 11/1994 | Philpot | 248/229 |
| 5,390,051 | 2/1995 | Saito et al. | 359/872 |
| 5,552,597 | 9/1996 | McConica | 250/234 |
| 5,586,212 | 12/1996 | McConica et al. | 385/146 |
| 5,592,337 | 1/1997 | Hama . | |
| 5,646,394 | 7/1997 | Steinle et al. | 250/208.1 |
| 5,675,431 | 10/1997 | Bock . | |

FOREIGN PATENT DOCUMENTS

| | | |
|---|---|---|
| 0 396 264 A2 | 11/1990 | European Pat. Off. . |
| 3300994 | 8/1984 | Germany . |
| 58-070207 | 4/1983 | Japan . |

*Primary Examiner*—Ramon O. Ramirez
*Assistant Examiner*—Jerome A. DeLuca

[57] ABSTRACT

A compliant mirror mounting system for holding a mirror may comprise a frame having first, second, and third mounting points thereon for receiving the mirror. The first, second, and third mounting points of the frame define a mounting plane containing an X-axis and a Y-axis of an orthogonal X-Y-Z coordinate system, wherein the first and second mounting points are located a spaced distance part along the X-axis. A first spring clip positioned adjacent the first mounting point holds the mirror against the first mounting point and forms a first Y-axis barrier which prevents a first end of the mirror from moving along the Y-axis by a distance that exceeds a Y-axis tolerance. A second spring clip positioned adjacent the second mounting point holds the mirror against the second mounting point and forms a second Y-axis barrier which prevents a second end of the mirror from moving along the Y-axis by a distance that exceeds the Y-axis tolerance. A third spring clip positioned adjacent the third mounting point holds the mirror against the third mounting point.

6 Claims, 5 Drawing Sheets

COMPLIANT OPTICAL MIRROR MOUNTING SYSTEM FOR HAND-HELD SCANNER DEVICES

FIELD OF INVENTION

This invention relates to imaging devices in general and more specifically to hand-held or portable optical scanners.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A typical optical scanner includes illumination and optical systems to illuminate the object and to focus a small area of the illuminated object, usually referred to as a "scan line," onto the surface of a photosensitive detector positioned within the scanner. Image data representative of the entire object may then be obtained by sweeping the illuminated scan line across the entire object, either by moving the object with respect to the illumination and optical assemblies or by moving the illumination and optical assemblies relative to the object. In any event, the illumination system may include a suitable light source (e.g., a fluorescent or incandescent lamp or an array of light emitting diodes) to illuminate the object, whereas the optical system may include a lens and mirror assembly to direct and focus the image of the illuminated scan line onto the surface of the detector.

The photosensitive detector array used to detect the image light is typically a charge-coupled device (CCD), although other devices may also be used. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals, known as sampling intervals, which may be about 5 milliseconds or so for a typical scanner, although other sampling intervals may be used.

A hand-held or portable optical scanner is an optical scanner which is designed to be moved by hand across the object to be scanned, e.g., a page of text or a drawing or photograph. Such hand-held or portable optical scanners are well-known in the art and various components thereof are disclosed in U.S. Pat. No. 5,552,597 of McConica, and U.S. Pat. No. 5,586,212 of McConica, et al, which are hereby incorporated by reference for all that they disclose.

One problem associated with hand-held scanners is that they may be subjected to rough handling and occasionally may even be dropped onto the floor. Such rough handling and occasional dropping may place extreme shock loads on the various components of the hand-held scanner, and efforts are continually being made to ensure that the various components of the hand-held scanners can withstand such shock loads. One component of a typical hand-held scanner that is particularly sensitive to such shock loads is the optical assembly (i.e., the lens and mirror assemblies) that are used to direct and focus the image light onto the surface of the detector. If the optical assembly is not sufficiently immune to damage and/or misalignment from shock loads, the result can be an improperly focused image with a commensurate decrease in scanned image quality. In extreme cases, the resulting image data may be useless, requiring that the optical system be repaired and/or realigned before the scanner is again functional.

SUMMARY OF THE INVENTION

A compliant mirror mounting system for holding a mirror may comprise a frame having first, second, and third mounting points thereon for receiving the mirror. The first, second, and third mounting points of the frame define a mounting plane containing an X-axis and a Y-axis of an orthogonal X-Y-Z coordinate system, wherein the first and second mounting points are located a spaced distance part along the X-axis. A first spring clip positioned adjacent the first mounting point holds the mirror against the first mounting point and forms a first Y-axis barrier which prevents a first end of the mirror from moving along the Y-axis by a distance that exceeds a Y-axis tolerance. A second spring clip positioned adjacent the second mounting point holds the mirror against the second mounting point and forms a second Y-axis barrier which prevents a second end of the mirror from moving along the Y-axis by a distance that exceeds the Y-axis tolerance. A third spring clip positioned adjacent the third mounting point holds the mirror against the third mounting point.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
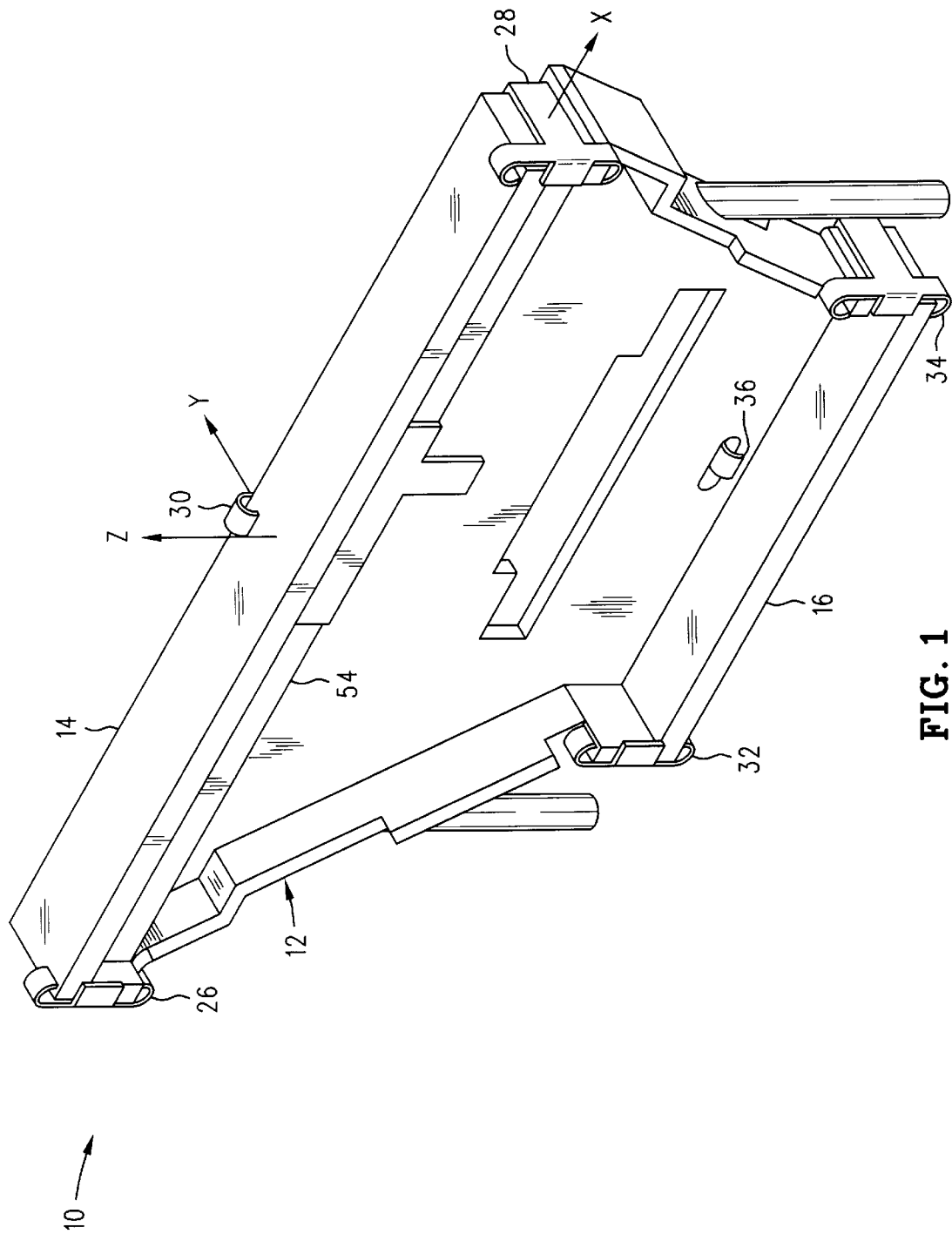
FIG. 1 is a perspective view of a compliant mirror mounting system according to one preferred embodiment of the present invention.

A compliant mirror mounting system 10 according to the present invention is best seen in FIG. 1 and may comprise a frame assembly 12 for holding one or more mirrors 14 and 16 in a mounting plane or planes that are fixed with respect to the frame assembly 12. The frame assembly 12 includes three mounting points or pads 38 (FIG. 7) which are co-planar with the mounting plane for the respective mirror 14, 16. A plurality of compliant retainers or spring clips 26, 28, 30, 32, 24, and 36 bias the mirrors 14 and 16 against the respective mounting points or pads 38 provided for each respective mirror 14, 16.

Figure 2:
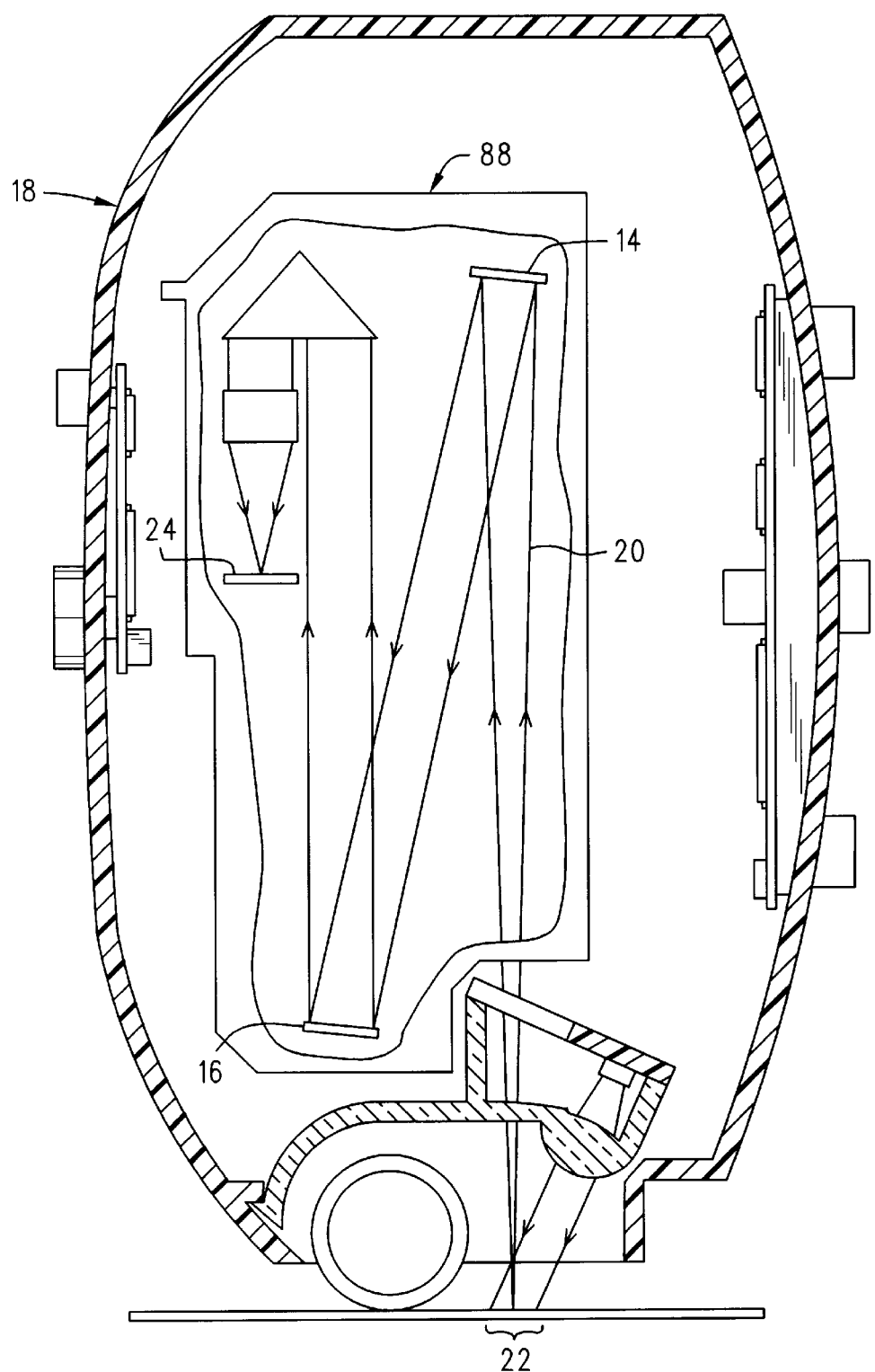
FIG. 2 is a schematic representation of a hand-held scanner that may utilize the compliant mirror mounting system shown in FIG. 1 to hold two mirrors in the optical system.

The compliant mirror mounting system 10 may be utilized in any of a wide range of devices and applications wherein it is desirable to provide a shock resistant, mechanically robust mounting system for optical components such as mirrors 14 and 16. For example, in one preferred embodiment, the compliant mirror mounting system 10 may be used in an optical system 88 of a hand-held scanner 18 to hold the mirrors 14 and 16 in positions suitable for allowing them to direct image light 20 from an illuminated scan area 22 and ultimately onto the surface of a detector assembly 24. See FIG. 2.

Figure 7:
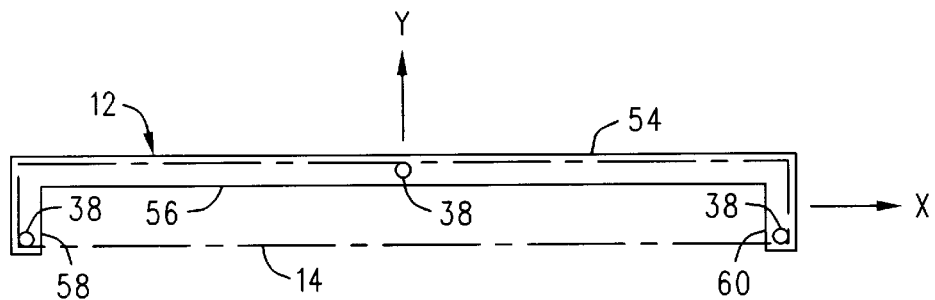
FIG. 7 is a plan view of the frame and mirror assembly with the mirror shown in phantom to reveal the locations of the three mounting pads.

Referring now to FIGS. 1 and 7, the frame assembly 12 of the compliant mirror mounting system 10 may be provided with three mounting points or pads 38 for each mirror 14, 16. For example, the three mounting points or pads 38 provided for the upper mirror 14 define a mounting plane which contains an X-axis and a Y-axis of an X-Y-Z orthogonal coordinate system. Consequently, the three mounting points or pads 38 provide a defined mounting plane for the mirror 14. In the embodiment shown and described herein, the lower section of the frame assembly 12 may also be provided with three mounting points or pads (not shown) which define a mounting plane for the lower mirror 16. Alternatively, the lower mounting points (not shown) may be omitted if the compliant mirror mounting system 10 is not to be provided with a lower mirror 16.

The upper and lower mirrors 14 and 16 are biased against their respective mounting points or pads 38 by a plurality of compliant retainer members or spring clips 26, 28, 30, 32, 34, and 36 which bias or "pre-load" the mirrors 14, 16 against their respective mounting points 38. Specifically, the upper mirror 14 is biased against the upper three mounting pads 38 on the upper portion of frame assembly 12 by a pair of upper end spring clips 26 and 28, and by an upper side spring clip 30. Similarly, the lower mirror 16 is biased against the lower three mounting pads (not shown) on the lower portion of frame assembly 12 by a pair of lower end spring clips 32 and 34, and by a lower side spring clip 36. Each spring clip 26, 28, 30, 32, 34, and 36 applies a restraining force to the mirrors 14, 16 that is generally perpendicular to the mounting (i.e., the X-Y) plane. Accordingly, the spring clips function to "pre-load" the mirrors 14 and 16 against their respective mounting points or pads 38.

Each end spring clip 26, 28, 32, and 34 is essentially identical and, in one preferred embodiment, may comprise a single piece of spring-type material (e.g., beryllium-copper alloy) formed so that it defines a main body portion 40 and a pair of side flanges 42 and 44 that extend from the main body portion 40. See FIG. 3. A pair of loop or clip portions 46 and 48 having arcuate or circular end sections also extend from the main body portion 40, but in directions that are generally perpendicular to the directions in which the side flanges 42 and 44 extend from the main body portion 40. The loop portions 46 and 48 together function to apply the vertical (i.e., Z direction) restraining force to the mirror 14.

As will be described in greater detail below, the side flanges 42 and 44 associated with each end spring clip also function as a Y-axis barrier to limit the ability of the mirror 14 to move in a direction that is substantially parallel to the Y-axis. That is, the Y-axis barrier formed by the pair of side flanges 42 and 44 prevents the mirror from moving along the Y-axis by a distance that exceeds a Y-axis tolerance (i.e., the sum of the two spaces 50 and 50' (FIG. 9) provided on either side of the mirror 14). Similarly, the main body portions 40 of end spring clips 26 and 28 together function as an X-axis barrier which limits the ability of the mirror 14 to move along the X-axis by a distance that exceeds an X-axis tolerance (i.e., the sum of the two spaces 52 and 52' (FIG. 8) provided on either end of the mirror 14).

The side spring clips 30 and 36 are also substantially identical and may also comprise a single piece of spring-type material formed so that it includes an elongate mid-section 80 that terminates at one end in a mirror loop section 82 and at the other in a flange clip section 84. The mirror loop section 82 contacts the upper surface 72 of mirror 14. The frame clip section 84 engages the side section 56 via a suitable aperture 62. The side clip 30 is sized so that it exerts a restraining force on the mirror 14 in a direction that is substantially perpendicular to the mounting (i.e., X-Y) plane.

A significant advantage of the compliant mirror mounting system 10 according to the present invention is that it provides a simple, yet mechanically robust system for holding a mirror in a fixed position with respect to the frame assembly. For example, the compliance provided by the various spring clips 26, 28, 30, 32, 34, and 36 minimizes the chances that mirrors 14, 16 will be damaged or broken if the frame assembly 12 is jarred or shocked, such as may occur if the device (e.g., the hand-held scanner 18) containing the mounting system 10 is accidently dropped. Another advantage of the spring clips is that they provide a significant restraining force only in a direction that is perpendicular to the mirror (e.g., in the Z direction and not in the X or Y directions), which minimizes the chances that the mirror will be distorted, thus improving the imaging performance of a system utilizing the compliant mirror mounting system 10. Additional advantages associated with the spring clips include low manufacturing costs and simplified assembly since each clip may comprise a single, unitary piece.

Still other advantages are associated with the three point mounting system utilized by the present invention. For example, the three mounting points or pads 38 provided on the frame assembly 12 are sufficient to define a mounting plane for the mirror, but do not over-constrain the mirror. Therefore, should the mirror be disturbed from its initial position, such as may occur if the frame assembly 12 is jarred or dropped, the spring clips will return the mirror to the mounting plane defined by the three pads 38, thus maintaining proper optical alignment.

The combination of the spring clips and three-point mounting system also provides significant advantages and benefits. For example, while the X- and Y-axis barriers provided by the end spring clips allow the mirror to move somewhat in the X-Y plane, the three-point mounting system fixes the location of the mounting plane in the X-Y plane. Consequently, the mirror will retain its optical alignment after a disturbance even though the mirror may have moved somewhat in the X-Y plane. The combination of the spring clips and three-point mounting system also allows the mirror and frame assemblies to expand and contract at different rates and by different amounts, such as may occur if the mirror and frame assembly have different coefficients of thermal expansion, as is typically the case.

Having briefly described the compliant mirror mounting system according to the present invention, along with some of its more significant features and advantages, the preferred embodiments of the compliant mirror mounting system 10 will now be described in detail. However, before proceeding with the detailed description, it should be noted that while the compliant mirror mounting system 10 according to the present invention is shown and described herein as it could be used in conjunction with a hand-held scanner 18 (FIG. 2) of the type well-known in the art, it is not limited to such a device or application. For example, the compliant mirror mounting system 10 could be used in flat-bed scanners and/or other types of optical systems or instruments wherein it is desired to provide shock-resistant structures for holding mirrors or other optical elements. Accordingly, the compliant mirror mounting system 10 according to the present invention should not be regarded as limited to the particular hand-held scanner device and application shown and described herein.

Referring back now to FIG. 1, the compliant mirror mounting system 10 according to one embodiment of the present invention may include a frame assembly 12 for holding one or more mirrors 14 and 16 in positions suitable for the intended application. For example, in one preferred embodiment, the frame assembly 12 may be used in an optical system 88 of a hand-held optical scanner 18 (FIG. 2) to position the upper and lower mirrors 14 and 16 so that they function to direct image light 20 from an illuminated scan area 22 and ultimately onto a detector assembly 24 located within the scanner 18. Alternatively, however, the compliant mirror mounting system 10 could be used in other applications wherein it would be desirable or advantageous to provide a shock-resistant mounting system for optical components.

In the embodiment shown and described herein, the frame assembly 12 is configured to receive two mirrors: An upper mirror 14 and a lower mirror 16. The frame assembly 12 is provided with three mounting points or pads 38 for each mirror 14 and 16. See for example, FIGS. 7 and 8 (note that only the three mounting points 38 for the upper mirror 14 are shown in the drawing figures). The three mounting points or pads 38 for each mirror 14, 16 define with specificity a mounting plane for each respective mirror 14, 16. The upper mirror 14 is biased against its respective mounting points or pads 38 by a pair of upper end clips 26 and 28 and by an upper side clip 30. Similarly, the lower mirror 16 is biased against its respective mounting points or pads 38 by a pair of lower end clips 32 and 34 and by a lower side clip 36. Before proceeding with the description, it should be noted that the following description is directed only to the details of the mounting system for the upper mirror 14, since the structure and components utilized to mount the lower mirror 16 are substantially identical to those associated with the upper mirror 14.

Referring to FIGS. 1 and 7, the upper portion of frame assembly 12 may be provided with a mounting flange 54 which includes a side section 56 and a pair of end sections 58 and 60. The side section 56 may include a single mounting point or pad 38 located at a position substantially midway between the two end sections 58 and 60 of flange 54. Similarly, each end section 58 and 60 of flange 54 may include a mounting point or pad 38. See FIG. 7. The mounting points or pads 38 located on each end section 58 and 60 may be located substantially opposite one another, although they need not be so located. The three mounting points or pads 38 together define a mounting plane that contains the X-axis and the Y-axis of the X-Y-Z orthogonal coordinate system, as best seen in FIG. 1. As used herein, the term "orthogonal coordinate system" refers to a three-dimensional coordinate system whose axes are mutually perpendicular.

The frame assembly 12 may be made from any of a wide range of materials (e.g., metals or plastics) suitable for the intended application. In one preferred embodiment, the frame assembly 12 is made from a magnesium alloy, although other materials could also be used. The mounting points or pads 38 are an integral part of the frame assembly 12, thus comprise the same material as the frame assembly. Alternatively, the mounting points or pads 38 could comprise separate elements made from the same or a different material as the frame assembly 12.

Two different types of spring clips are used to hold or bias the mirror 14 against the pads 38: An end spring clip (e.g., clips 26 and 28) and a side spring clip (e.g., clip 30). See FIG. 1. The end spring clips 26 and 28 are mounted to the end portions 58 and 60 of flange 54 and hold the respective ends of the mirror 14 against the pads 38 located on the respective end sections 58 and 60 of flange 54. The side clip 30 engages an aperture 62 of the side section 56 of flange 54 and biases the center portion of mirror 14 against the pad 38 located on the side section 56. Also, it is generally preferred, but not required, that each spring clip be positioned so that it is substantially aligned with the mounting point or pad 38. Since each end clip 26, 28 is substantially identical, only end clip 26 will be described in detail herein.

Figure 3:
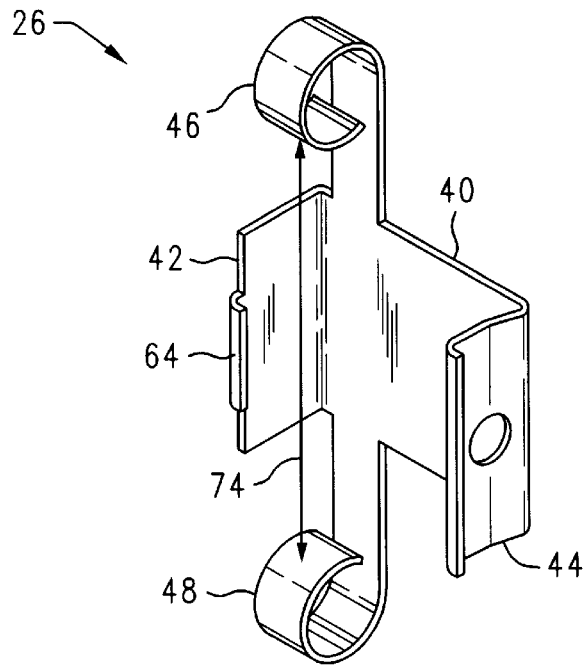
FIG. 3 is an enlarged perspective view of an end spring clip.
Figure 4:
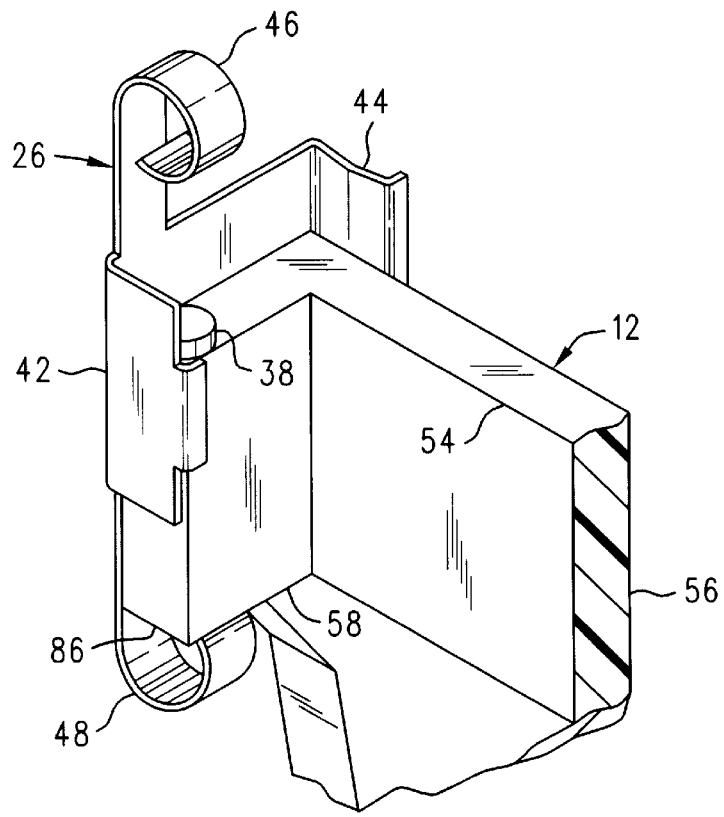
FIG. 4 is an enlarged perspective view of the end spring clip shown in FIG. 3 illustrating its attachment to the frame assembly.
Figure 5:
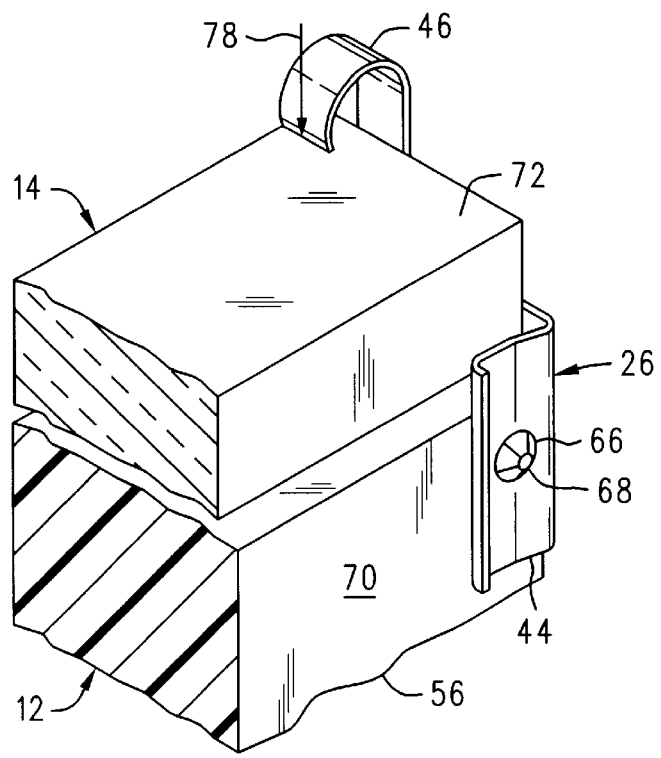
FIG. 5 is an enlarged perspective view of the end spring clip assembly of FIG. 4 showing the engagement of the mounting hole with the retaining pin.

Referring now to FIGS. 3–5 simultaneously, end clip 6 may comprise a unitary member having a main body section 40 from which extend a pair of end flanges 42 and 44. The end flanges 42 and 44 are spaced so that they exert a compressive force on the end section 58 of flange 54. The compressive force allows the clip 26 to be retained on the end section 58. To further help retain the end clip 26 on the end section 58 of frame assembly 12, the side flange 42 may be provided with an end flange section 64 which engages the end section 58 of flange 54 in the manner best seen in FIG. 4. The side flange 44 of clip 26 also may be provided with an aperture or hole 66 that is sized to engage a pin 68 which may be provided on the back side 70 of the side section 56 of flange 54. See FIG. 5.

End clip 26 is also provided with a mirror loop or clip portion 46 and a frame loop or clip portion 48. The mirror and frame loops 46 and 48 extend from the main body portion 40 of end clip 26 in directions that are generally perpendicular to the directions in which the side flanges 42 and 44 extend from the main body portion 40. See FIG. 3. That is, side flanges 42 and 44 extend from the "right" and "left" sides of the main body portion 40 of clip 26 while the mirror and frame loops 46 and 48 extend from the "top" and "bottom" sides of the main body portion 40. The mirror loop 46 contacts the top surface 72 of mirror 14 when the mirror 14 is positioned on the pads 38. The frame loop 48 contacts the underside 86 of end section 58 of flange 54, as best seen in FIG. 4.

The mirror and frame loops 46 and 48 are separated by a distance 74 (FIG. 3) that is slightly less than the thickness 76 (FIG. 9) of the mirror 14, pad 38, and end section 58 of flange 54. Accordingly, the mirror loop 46 exerts a restraining force 78 (FIG. 5) on the mirror 14 that is substantially perpendicular to the surface 72 of mirror 14. That is, the restraining force 78 is substantially parallel to the Z-axis of the X-Y-Z orthogonal coordinate system. See FIGS. 1 and 8.

Figure 9:
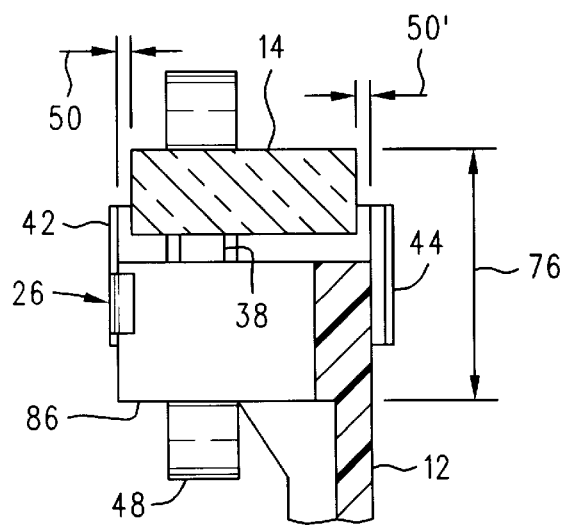
FIG. 9 is a sectional view in elevation of the frame and mirror assembly taken along the line 9—9 of FIG. 8.

The side flanges 42 and 44 of the end clip 26 together form a Y-axis barrier which prevents the mirror 14 from moving along the Y-axis by a distance that exceeds the Y-axis tolerance. Referring now to FIG. 9, the Y-axis tolerance is equal to the sum of the spaces 50 and 50' provided between the mirror 14 and each respective side flange 42, 44 of end clip 26. The Y-axis tolerance may be chosen to provide the some degree of movement along the Y-axis, but without adversely affecting the ability of the mirror 14 to reflect the image light 20 to the desired location. In one preferred embodiment, the Y-axis tolerance may be in the range of about 0.3 mm to 0.5 mm, although other tolerances may be used.

Figure 8:
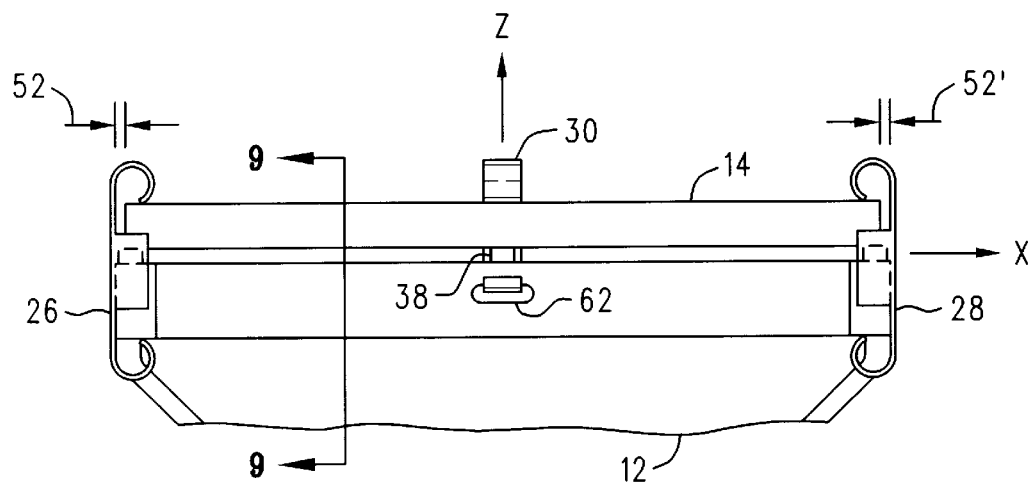
FIG. 8 is a front view in elevation of the frame and mirror assembly.

The main body sections 40 of the opposed end clips 26 and 28 together form an X-axis barrier which prevents the mirror 14 from moving along the X-axis by a distance that exceeds the X-axis tolerance. Referring now to FIG. 8, the X-axis tolerance is equal to the sum of the spaces 52 and 52' provided between the ends of the mirror 14 and the main body portions 40 of the respective end clips 26, 28. The X-axis tolerance may be selected to provide some freedom of movement along the X-axis, but, again, without adversely affecting the ability of the mirror 14 to reflect the image light 20 to the desired location. By way of example, in one preferred embodiment, the X-axis tolerance may be in the range of about 0.3 mm to 0.5 mm, although other tolerances may be used.

Figure 6:
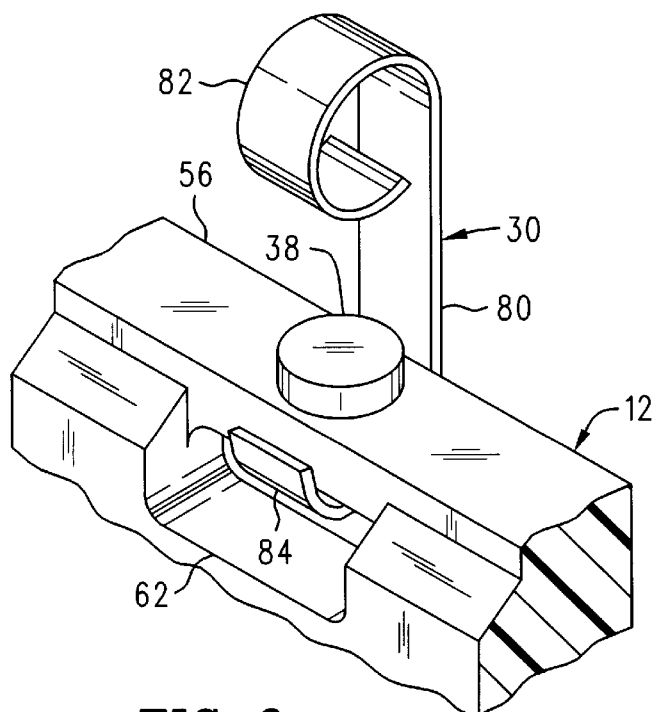
FIG. 6 is an enlarged perspective view of a side spring clip attached to the frame of the compliant mirror mounting system.

The side clip 30 is best seen in FIG. 6 and may comprise an elongate mid-section 80 that terminates at one end in a mirror loop or clip section 82 and at the other in a flange clip section 84. The mirror loop 82 contacts the upper surface 72 of mirror 14 in a manner similar to the mirror loop section 46 of end clip 26 just described. The frame clip section 84 engages the side section 56 of flange 54 via a suitable aperture 62. The side clip 30 is sized so that it exerts a restraining force (not shown) on the upper surface 72 of mirror 14 in a direction that is substantially parallel to the Z-axis. It is preferred, but not required, that the restraining force exerted by the side clip 30 be substantially identical to the restraining force (e.g., force 78) exerted by the end clips (e.g., clips 26 and 28).

The end clips (e.g., clips 26 and 28) and side clip 30 may be made from any of a wide range of materials suitable for the intended application. In one preferred embodiment, each clip is made as a single piece from beryllium-copper alloy, although other materials could also be used.

It is contemplated that the inventive concepts herein described may be variously otherwise embodied and it is intended that the appended claims be construed to include alternative embodiments of the invention except insofar as limited by the prior art.

What is claimed is:

1. A compliant mirror mounting system for holding a mirror, comprising:

a frame having first, second, and third mounting points thereon for receiving the mirror, the first, second, and third mounting points defining a mounting plane containing an X-axis and a Y-axis of an orthogonal X-Y-Z coordinate system, wherein said first and second mounting points are located a spaced distance apart along the X-axis;

a first spring clip positioned adjacent the first mounting point, said first spring clip adapted to hold the mirror against the first mounting point by applying a first restraining force along a Z-axis of the orthogonal X-Y-Z coordinate system, said first spring clip forming a first Y-axis barrier which prevents a first end of the mirror from moving along the Y-axis by a distance that exceeds a Y-axis tolerance;

a second spring clip positioned adjacent the second mounting point, said second spring clip adapted to hold the mirror against the second mounting point by applying a second restraining force along the Z-axis of the orthogonal X-Y-Z coordinate system, said second spring clip forming a second Y-axis barrier which prevents a second end of the mirror from moving along the Y-axis by a distance that exceeds the Y-axis tolerance, wherein said first and second spring clips are located in spaced-apart relation along the X-axis of the orthogonal X-Y-Z coordinate system and together form an X-axis barrier to prevent the mirror from moving along the X-axis by a distance that exceeds an X-axis tolerance; and a third spring clip positioned adjacent the third mounting point, said third spring clip adapted to hold the mirror against the third mounting point by applying a third restraining force along the Z-axis of the orthogonal X-Y-Z coordinate system.

2. The mounting system of claim 1, wherein said first spring clip includes a first side flange and a second side flange, the first and second side flanges of said first spring clip forming the first Y-axis barrier, and wherein said second spring clip includes a first side flange and a second side flange, the first and second side flanges of said second spring clip forming the second Y-axis barrier.

3. The mounting system of claim 2, wherein said third spring clip is located at a position between said first and second spring clips.

4. The mounting system of claim 1, wherein said first spring clip comprises:

a main body section;

a first flange extending outwardly from said main body section;

a second flange extending outwardly from said main body section, said first and second flanges being located in spaced-apart relation and extending outwardly from said main body section in respective first and second directions that are substantially perpendicular to said main body section;

a mirror loop section extending outwardly from said main body section; and a flange loop section extending outwardly from said main body section, said flange loop section being located substantially opposite said mirror loop section, said mirror and flange loop sections being located substantially laterally between said first and second flanges.

5. The mounting system of claim 4, wherein said third spring clip comprises an elongate main body portion terminating at one end in a mirror loop section and at the other end in a flange clip section, the mirror loop section being sized to contact the mirror and to apply the restraining force to the mirror, said flange clip section being adapted to engage said frame assembly.

6. A compliant mirror system, comprising:

a frame having first, second, and third mounting points thereon for receiving the mirror, the first, second, and third mounting points defining a mounting plane, the mounting plane containing an X-axis and a Y-axis of an orthogonal X-Y-Z coordinate system, the first and second mounting points being located a spaced distance apart along the X-axis;

a generally elongate mirror having a first end and a second end positioned on the first, second, and third mounting points of said frame so that the first end of said elongate mirror is located adjacent said first mounting point and so that the second end of said elongate mirror is located adjacent said second mounting point;

a first spring clip comprising
  a main body section;
  a first flange extending outwardly from said main body section;
  a second flange extending outwardly from said main body section, said first and second flanges being located in spaced-apart relation and extending outwardly from said main body section in respective first and second directions that are substantially perpendicular to said main body section;
  a mirror loop section extending outwardly from said main body section; and
  a flange loop section extending outwardly from said main body section, said flange loop section being located substantially opposite said mirror loop section, said mirror and flange loop sections being located substantially laterally between said first and second flanges,
said first spring clip being positioned adjacent the first mounting point so that the flange loop section engages said frame and so that said mirror loop section engages the first end of said mirror, said first spring clip applying a first restraining force to said mirror in a direction that is substantially perpendicular to the mounting plane, the first and second flanges of said first spring clip forming a Y-axis barrier to prevent the first end of said mirror from moving along the Y-axis by a distance that exceeds a Y-axis tolerance;
  a second spring clip comprising
    a main body section;
    a first flange extending outwardly from said main body section;
    a second flange extending outwardly from said main body section, said first and second flanges being located in spaced-apart relation and extending outwardly from said main body section in respective first and second directions that are substantially perpendicular to said main body section;
    a mirror loop section extending outwardly from said main body section; and
    a flange loop section extending outwardly from said main body section, said flange loop section being located substantially opposite said mirror loop section, said mirror and flange loop sections being located substantially laterally between said first and second flanges,
said second spring clip being positioned adjacent the second mounting point so that the flange loop section engages said frame and so that said mirror loop section engages the second end of said mirror, said second spring clip applying a second restraining force to said mirror in a direction that is substantially perpendicular to the mounting plane, the first and second flanges of said second spring clip forming a Y-axis barrier to prevent the second end of said mirror from moving along the Y-axis by a distance that exceeds a Y-axis tolerance; and
  a third spring clip positioned adjacent the third mounting point, said third spring clip adapted to hold the mirror against the third mounting point by applying a third restraining force in a direction that is substantially perpendicular to the mounting plane.

* * * * *